US006859919B1

(12) United States Patent
Deffler et al.

(10) Patent No.: US 6,859,919 B1
(45) Date of Patent: Feb. 22, 2005

(54) OBJECT MODELING TOOL WITH META MODEL SEMANTIC REGISTRY (RULES) A META DATA MANAGER FOR OBJECT(S) PROPERTIES AN OBJECT/PROPERTY INTERFACE FOR INSTANCE(S) OF OBJECTS/PROPERTIES RECEIVED VIA OBJECT/PROPERTY INTERFACE OF THE OBJECT FACTORY REGISTRY

(75) Inventors: Tad A. Deffler, Boonton, NJ (US); Mark Russo, Belle Mead, NJ (US)

(73) Assignee: Computer Associates Think, Inc., Islandia, NY (US)

( * ) Notice: Subject to any disclaimer, the term of this patent is extended or adjusted under 35 U.S.C. 154(b) by 0 days.

(21) Appl. No.: 09/420,223

(22) Filed: Oct. 16, 1999

Related U.S. Application Data
(60) Provisional application No. 60/104,682, filed on Oct. 16, 1998.

(51) Int. Cl.[7] ................................................. G06F 9/44
(52) U.S. Cl. ..................... 717/100; 717/108; 717/117
(58) Field of Search ................................ 717/100, 108, 717/117

(56) References Cited

U.S. PATENT DOCUMENTS

| | | | | |
|---|---|---|---|---|
| 5,421,016 | A | * | 5/1995 | Conner et al. ............. 717/146 |
| 5,692,195 | A | * | 11/1997 | Conner et al. ............. 709/316 |
| 5,717,924 | A | | 2/1998 | Kawai |
| 5,768,586 | A | | 6/1998 | Zweben et al. |
| 5,974,253 | A | * | 10/1999 | Nahaboo et al. ............ 717/105 |
| 6,003,037 | A | * | 12/1999 | Kassabgi et al. ........ 707/103 R |
| 6,011,917 | A | * | 1/2000 | Leymann et al. ........... 717/104 |
| 6,114,978 | A | * | 9/2000 | Hoag .......................... 341/23 |
| 6,247,020 | B1 | * | 6/2001 | Minard ..................... 707/104.1 |
| 6,385,767 | B1 | * | 5/2002 | Ziebell ....................... 717/170 |
| 6,502,234 | B1 | * | 12/2002 | Gauthier et al. ............ 717/107 |
| 6,513,152 | B1 | * | 1/2003 | Branson et al. ............. 717/100 |

OTHER PUBLICATIONS

"Integrating Object–Oriented Data Modeling With A Rule Based Programming Paradigm", F. Carcace et al, ACM, 1990, pp. 225–236.*
Forte Software Inc, Product Forte version 1.0 released Jun. 30, 1994, TOOL Reference Manual—whole manual.*
Forte Software Inc, Product Forte version 1.0 released Jun. 30, 1994, A Guide to the Forte Workshops—whole manual.*
Forte Software Inc, Product Forte version 1.0 released Jun. 30, 1994, Framework Project– whole manual.*
Forte Software Inc, Produtct Forte version 1.0 release Jun. 30, 1994, System Management Guide—whole manual.*
Visual Object Oriented Programming Concepts and Environments, M.M. Burnett et al. , pp. 1–273, published 1994.*
Client/Server Programming with JAVA and CORBA Second Edition, R. Orfali et al, , pp. 1–60, 331–371, 433–518, 711–830 and 905–932, published Jan. 30, 1997.*
"Object–Oriented Modeling and Design", James Rumbaugh et al, pp. 69–71, published Nov. 14, 1990.*
Logic Works Release Beta of Object–Relational Modeling Tool for Universal Server Databases. Informix User Conference, San Francisco, CA. Jul. 22, 1997 www.microway.com.au/press/logic_umabeta.htm.

(List continued on next page.)

Primary Examiner—Todd Ingberg
(74) Attorney, Agent, or Firm—Cooper & Dunham LLP

(57) ABSTRACT

A method and apparatus for building a modeling tool that includes a meta model that has a semantic registry and a meta data manager, an object/property interface, and an object/property factory registry. The object/property factory registry is coupled to the meta model and the object/property interface. The apparatus also includes an object/property model coupled to the object/property interface. The semantic registry includes at least a predefined set of semantics.

17 Claims, 7 Drawing Sheets

OTHER PUBLICATIONS

Rational Rose/C++, Round Trip Engineering with Rational Rose C++, Rational Software Corporation, released Nov. 1996 (RAT-C++).

Rational Rose, Using Rational Rose 4.0, Rational Software Corporation, released Nov. 1996 (RAT-UR).

Unified Modeling Language UML & Booch & OMT, Quick Reference for Rational Rose 4.0, released Nov. 1996.

Kantorowitz E., "Algorithm Simplication Through Object Orientation", Software Practice & Experience, John Wiley & Sons Ltd. Chichester, GB, vol. 27, No. 2, Feb. 1, 1997, pp. 173-183.

Ying Yang: "Change Management In Object-Oriented Databases", Proceedings of the International Phoenix Conference on Computers and Communciations. Tempe, Mar. 23-26, New York, IEEE, US, vol. CONF. 12, Mar. 23, 1993, pp. 238-244.

B.P. Douglass, "Designing Real-Time Systems With the Unified Modeling Language", Electronic Design, Penton Publishing, Cleveland, OH, US, vol. 45, No. 20, Sep. 15, 1997, p. 132,134, 136.

* cited by examiner

OBJECT MODELING TOOL WITH META MODEL SEMANTIC REGISTRY (RULES) A META DATA MANAGER FOR OBJECT(S) PROPERTIES AN OBJECT/PROPERTY INTERFACE FOR INSTANCE(S) OF OBJECTS/PROPERTIES RECEIVED VIA OBJECT/PROPERTY INTERFACE OF THE OBJECT FACTORY REGISTRY

CROSS-REFERENCE TO RELATED APPLICATIONS

The present application claims benefit of the filing date of U.S. Provisional Application No. 60/104,682 entitled MODELING TOOL SYSTEMS AND METHODS, filed on Oct. 16, 1998, incorporated by reference herein in its entirety.

The present application is related to a co-pending U.S. patent application Ser. No. 09/449,731 entitled METHOD FOR IMPACT ANALYSIS OF A MODEL, being concurrently filed on the same day, which is incorporated by reference herein in its entirety.

The present application is related to co-pending U.S. patent application Ser. No. 09/419,736 entitled METHOD FOR DETERMINING DIFFERENCES BETWEEN TWO OR MORE MODELS, being concurrently filed on the same day, which is incorporated by reference herein in its entirety.

The present application is related to co-pending U.S. patent application Ser. No. 09/419,749 entitled METHOD AND SYSTEM FOR AN EXTENSIBLE MACRO LANGUAGE, being concurrently filed on the same day, which is incorporated by reference herein in its entirety.

The present application is related to co-pending U.S. patent application Ser. No. 09/418,751 entitled METHOD AND APPARATUS FOR PROVIDING ACCESS TO A HIERARCHICAL DATA STORE THROUGH AN SQL INPUT, being concurrently filed on the same day, which is incorporated by reference herein in its entirety.

REFERENCE TO PAPER APPENDIX

The present application includes a paper appendix attached hereto setting forth exemplary services and functions for an exemplary embodiment of the present invention which is hereby incorporated by reference. A portion of the disclosure of the present application includes material which is subject to copyright protection. The copyright owner has no objection to the facsimile reproduction by anyone of the patent disclosure, as it appears in the Patent & Trademark Office patent files or records, but otherwise reserves all copyright rights whatsoever.

FIELD OF THE INVENTION

The present invention relates to a modeling engine, in particular to an apparatus and method for building modeling tools.

BACKGROUND INFORMATION

Modeling tools have existed for many years. The general method of implementing such modeling tools is to write a specific modeling tool that implements a specific modeling methodology. Although this method has generally been accepted, such a method has several disadvantages. For example, conventional modeling tools require a new implementation for the creation of each new modeling tool, even though many functions within a given tool are similar, if not the same, as prior tools.

A need exists for a method and apparatus for building modeling tools using a uniform framework constructed to support the generation of multiple, disparate modeling methodologies. This new apparatus and method for building modeling tools will reduce the effort and time required to implement a new modeling tool.

SUMMARY OF THE INVENTION

An aspect of the present invention is providing a method and apparatus that includes semantics and a model having objects and properties. Semantics are applied against transactions that change objects and properties that may be included in the model. Any changes to the objects and properties by a transaction that violates the respective semantics are undone. Further, the semantics may be extended by a developer.

Another aspect of the present invention provides an apparatus for building a modeling tool. The apparatus includes, for example, a meta model that has a semantic registry and a meta data manager, an object/property interface, and an object/property factory registry. The object/property factory registry is coupled to the meta model and the object/property interface. The apparatus also includes an object/property model coupled to the object/property interface.

Yet another aspect of the present invention provides a method for building a modeling tool. The method includes constructing an object/property model by defining a first set of classes and constructing a meta model by defining a second set of classes. The method also includes associating a type code with the first and second set of classes and providing a predefined set of semantics to the meta model. The method further includes identifying a plurality of discrete events with at least one semantic of the set of semantics being invoked at each occurrence of the plurality of discrete events. The method also includes providing an object/property interface for limiting access to the object/property model from a developer.

DETAILED DESCRIPTION

Figure 1:
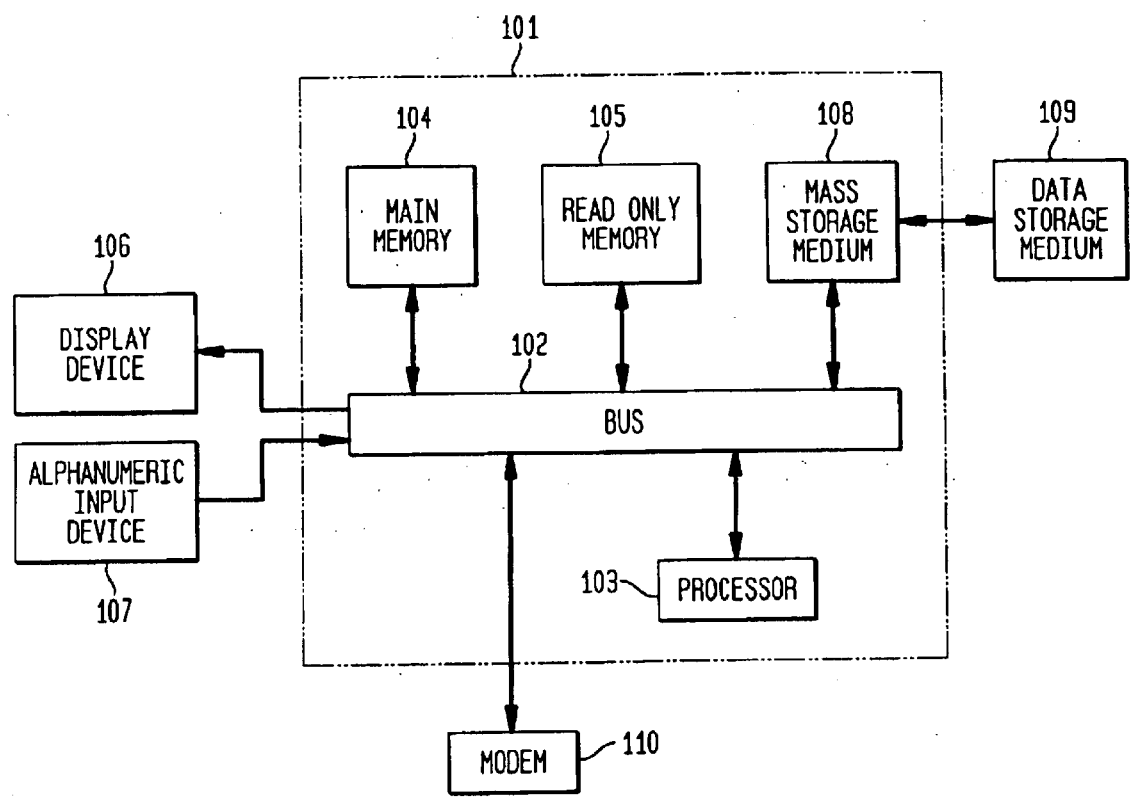
FIG. 1 illustrates a functional block diagram of a conventional computer system.

FIG. 1 illustrates a conventional computer system 101 in which the present invention operates. In an exemplary embodiment, the present invention is implemented, for example, on a SUN™ Workstation manufactured by SUN MICROSYSTEMS™. Alternate embodiments may be implemented, for example, on an IBM™ Personal Computer manufactured by IBM Corporation or a MACINTOSH™ computer manufactured by APPLE™ Computer. It will be apparent to those of ordinary skill in the art that other computer system architectures may also be employed. In general, such computer systems as illustrated by FIG. 1 include a bus 102 for communicating information, a processor 103 such as a central processing unit coupled to the bus 102 for processing information, and a main memory 104 coupled to the bus 102 for storing information and instructions for the processor 103. A read-only memory 105 is coupled to the bus 102 for storing static information and instructions for the processor 103. A display device 106 coupled to the bus 102 displays information, for example, for a developer.

An alphanumeric input device 107, such as a key board, is coupled to the bus 102 and communicates information and command selections to the processor 103. A modem 110 is coupled to the bus 102 and provides communication with, for example, other computer systems or databases and a mass storage medium 108, such as a magnetic disk and associated disk drive coupled to the bus 102 for storing information and instructions. A data storage medium 109 containing digital information is configured, for example, to operate with a mass storage medium 108 to allow processor 103 access to the digital information on data storage medium 109 via bus 102. In addition, a CD-ROM drive (not shown) may also be used for the storage of high resolution images for display on the display device 106.

An embodiment of the present invention is implemented, for example, as a software module written in the C++ programming language which may be executed on a computer system such as computer system 101 in a conventional manner. Using well known techniques, the application software may be stored on data storage medium 109 and subsequently loaded into and executed within the computer system 101. Once initiated, the software of the preferred embodiment operates, for example, in the manner described below. Universal Modeling Architecture (UMA) is a data-driven modeling engine that could work in various problem domains based on an external definition of a meta model that may be provided by a developer and be extended to provide an UMA-based product. An external definition of a meta model is, for example, a series of descriptions of the types of objects that are to be found in the problem domain, and the properties associated with each of these objects. These descriptions may be provided by invoking a set of functions exposed by the implementation, and passing in, via function parameters, the descriptive information. Exemplary problem domains may include: data modeling such as database tables, columns and indices; process modeling such as activities and arrows; access modeling such as data manipulation language statements and files; and component modeling such as interfaces, implementations, and dependencies.

In an exemplary embodiment of the present invention, the UMA-based product is a modeling tool. The UMA-based product may be an UMA-based application such as a user interface that includes UMA. The UMA-based product may also include an instance of an object/property model based on an external definition of the meta model provided by, for example, a developer.

Figure 2:
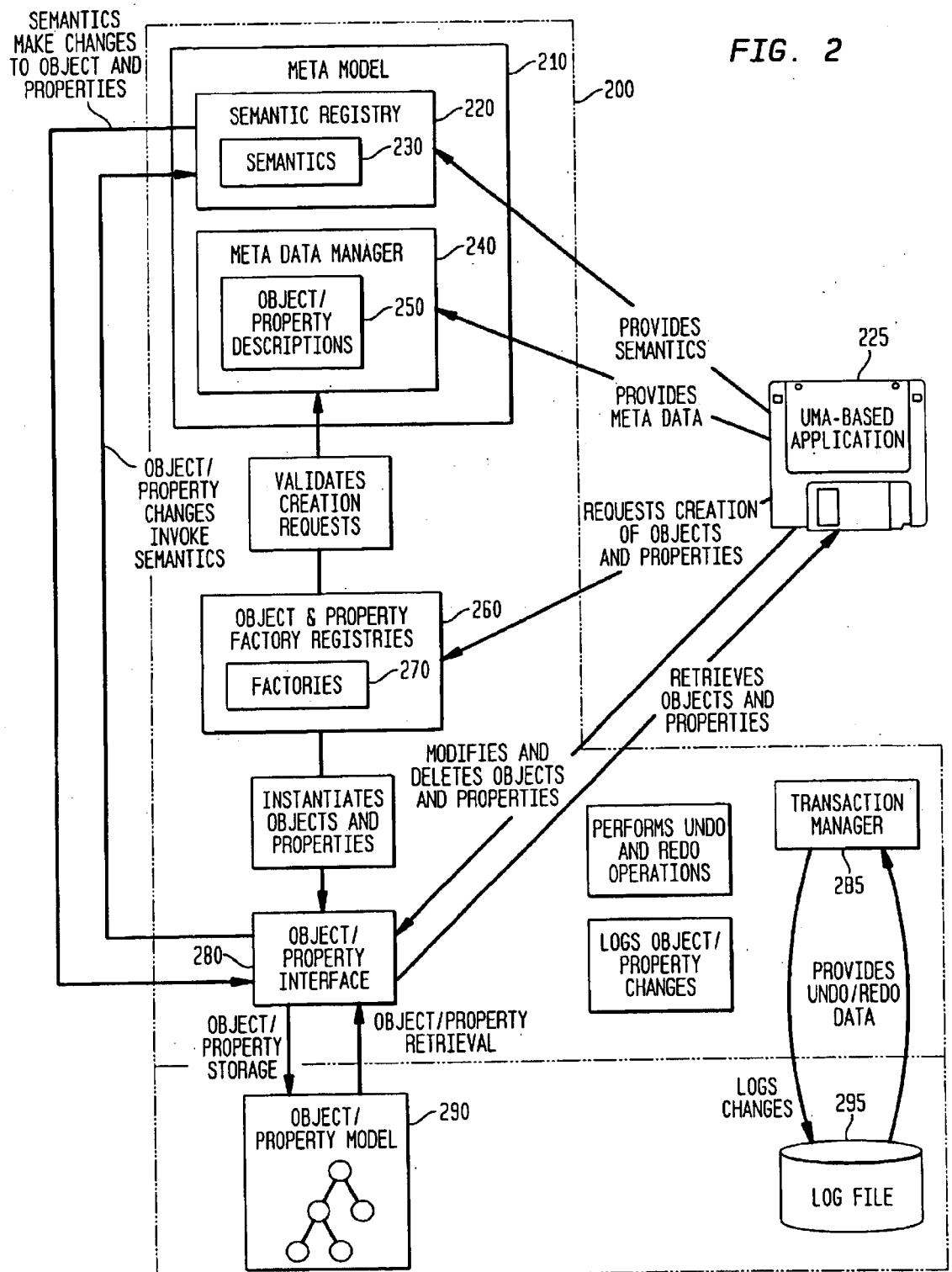
FIG. 2 illustrates a functional block diagram of an exemplary embodiment of the present invention.

In an exemplary embodiment of the present invention, as shown in FIG. 2, UMA 200 includes a meta model 210, object and property factory registries 260, object/property interface 280, transaction manager 285, log file 295, and object/property model 290. The meta model 210 may include a semantic registry 220 including a plurality of sets of semantics 230 and a meta data manager 240 including object/property descriptions 250. The object/property descriptions 250 are sets of information describing the characteristics of an object or a property. In the case of objects, this may include its name, a human-readable piece of descriptive text, generalization information, information about what other types of objects may be contained within it. Generalization information, for example, describes refinement/subtyping such as synonyms information.

Object/property descriptions may be provided by the developer or user as the externally defined meta model. The meta model 210 is a description of the objects and properties of the problem domain to be solved and a plurality of sets of semantics 230 to be respectively invoked to change objects and properties when changes to such objects and properties are requested.

Figure 3:
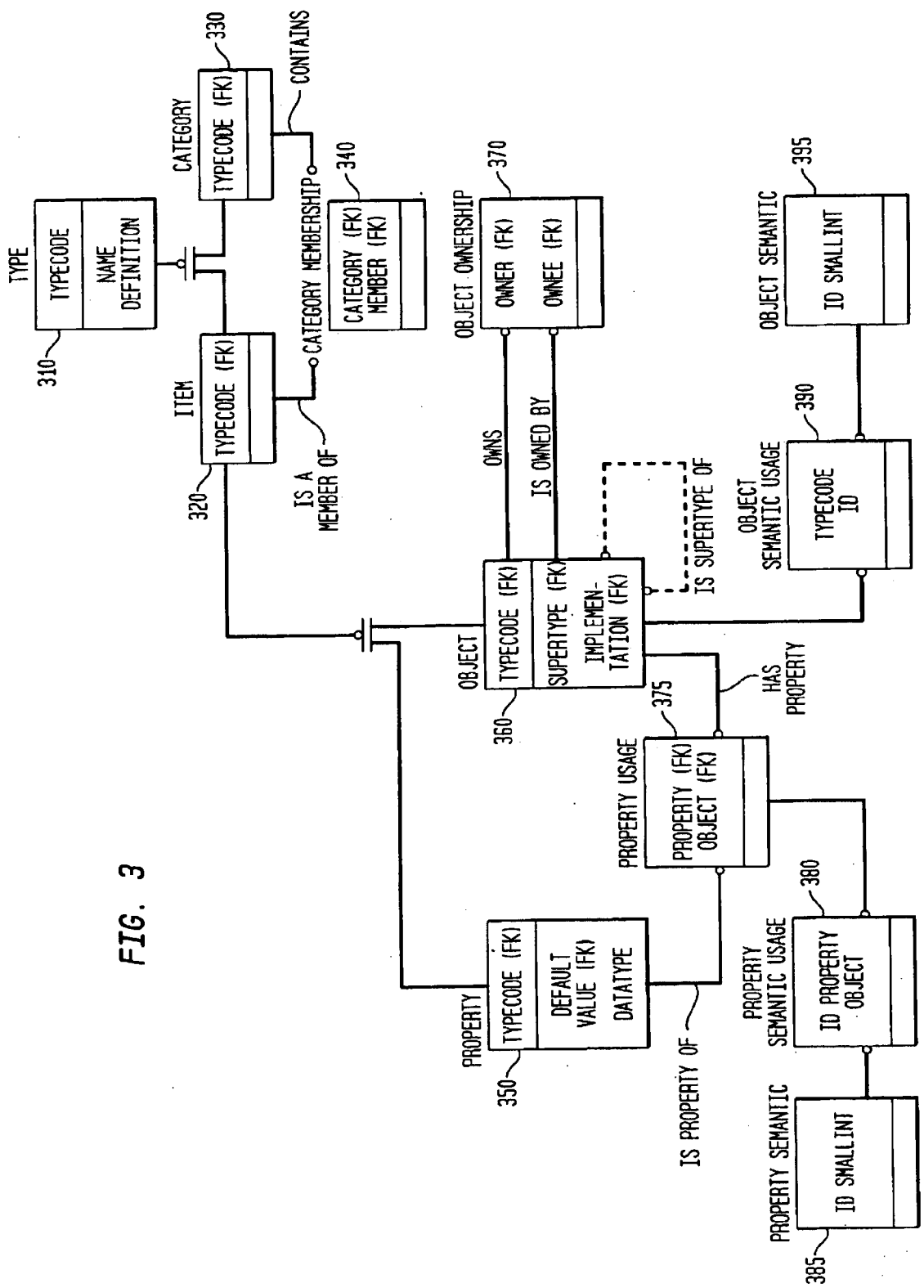
FIG. 3 illustrates a data model of an exemplary embodiment of a meta model of the present invention.

FIG. 3 shows an exemplary embodiment of meta model 210 of the present invention. As shown in FIG. 3, the meta model 210 includes a plurality of classes such as objects, properties and semantics and establishes relationships between objects, properties and semantics. Type 310 is associated with a type code key, name attribute and definition attribute. Type 310 can be, for example, a category 330 or an item 320. Category 330 is associated with a type code key and includes a plurality of items. Category membership 340 is associated with a category key and member key. Item 320 is associated with a type code key and can be a property or object.

Property 350 is associated with a type code key, default value attribute and datatype attribute. Property 350 is also associated with property usage 375. Object 360 is associated with a type code key, object implementation attribute, and supertype attribute. A supertype attribute provides further specificity to the object 360. Object 360 may own (e.g., include as a component) and be owned by other objects. Object ownership 370 is associated with owner key and ownees key. Property usage 375 is associated with property key and object key.

Property usage 375 also associates the property 350 with the object 360. Object semantic usage 390 is associated with a type code key and identification (ID) key. Object semantic usage 390 associates object 360 with object semantic 395. The object semantic 395 is associated with an ID key. Property semantic usage 380 is associated with an ID key, property key and object key. Property semantic usage 390 associates property semantic 385 with property usage 375. Property semantic 385 is associated with an ID key.

As shown in FIG. 2, the meta data manager 240 of the meta model 210 receives meta data (e.g., description of objects and properties), for example, from a developer through an UMA-based application 225. The meta data is what are the objects and properties provided by a developer to solve the problem domain of the developer. The meta data manager 240 receives validation creation requests from object and property factory registries 260.

As shown in FIG. 2, the semantic registry 220 of the meta model 210 includes a plurality of sets of semantics 230 which may include, for example, a predefined set and additional sets provided by the developer through an UMA-based application. Semantics 230 are modeling rules encapsulated in semantic objects that expose an interface, such as a pure virtual class, that hide the modeling engine from details of the semantics 230. The predefined semantic set provides rules to enforce the integrity of the underlying modeling engine and in an exemplary embodiment of the present invention, the predefined semantic set cannot be changed by a developer. The additional sets of semantics provided by the developer can be modified by the developer. An example of a semantic may be, for example, one that enforces the rule "No two columns in a single database table may have the same name."

Semantics 230 gain access to object/property model 290 through object/property interface 280. The semantic registry 220 may include an object semantic registry for determining if a specific set of object semantics exist and, if so, locating respective sets of object semantics. The semantic registry 220 may also include a property semantic registry for determining if a specific set of property semantics exist and, if so, locating the respective set of property semantics. The semantic registry 220 locates the respective set of semantics requested, for example, by object/property interface 280. The semantic registry 220 makes changes to the respective objects and properties in accordance with the semantics invoked and provides the changed objects and properties to object/property interface 280. The semantic registry 220 also provides the status of an action of a transaction to the object/property interface 280. For example, one of the semantics invoked for an action may be violated and, thus, indicate that the action has failed.

Object and property factory registries 260 may include factories 270 such as object factories and property factories, respectively. The object and property factory registries 260 receive requests for the creation of objects and properties, for example, from a developer through an UMA-based application 225. The factories 270 create objects and properties. The object and property factory registries 260 determine if a specific factory exists and, if so, locate the respective factory to create the respective object or property being requested. The object and property factory registries 260 also provide a validation creation request to the meta data manager 240. The validation may include, for example, whether the creation of the object or property requested was successful. The object and property factory registries 260 instantiate objects and properties, respectively, and provide such objects and properties to object/property interface 280.

As shown in FIG. 2, object/property interface 280 receives requests for the modification and deletion of objects and properties, for example, by a developer through UMA-based application 225. Such requests invoke the respective semantics in meta model 210 which may result in changes to the objects and properties which are provided to object/property interface 280 from semantic registry 220 of meta model 210. The object/property interface 280 may identify a discrete event from a plurality of discrete events, for example, as shown in Table One, and determine that a semantic or set of semantics should be invoked. The discrete events indicate occurrences where object/property model 290 may be modified. In an exemplary embodiment of the present invention, authors of UMA may provide a plurality of discrete events.

TABLE ONE

| Constant | Description |
| --- | --- |
| PostCreation | An object is being created |
| PreDestruction | An object is being destroyed |
| PreEdit | A property is about to be created and/or modified |

TABLE ONE-continued

| Constant | Description |
| --- | --- |
| PostEdit | A property has just been created and/or modified |
| PreNull | A property is about to be destroyed |
| PreOwnerDestruction | The object owning a property is about to be destroyed |

The object/property interface 280 is provided with the status of an action of a transaction by semantic registry 220 based on the result of the respective set of semantics invoked. For example, if an action caused any one of the set of semantics invoked to be violated, semantic registry 220 may provide an indication that the action failed. If the action did not cause any one of the set of semantics to be violated, however, semantic registry 220 may provide an indication that the action was successful. The object/property interface 280 provides object and property changes to the transaction is manager 285 and, if the object/property interface 280 determines that an action failed, it may provide an indication that the action failed to transaction manager 285. The object/property interface 280 also provides objects and properties to object/property model 290. The object/property 280 interface also retrieves objects and properties from object/property model 290, for example, to provide such objects and properties to an UMA-based application 225 if requested.

Figure 4:
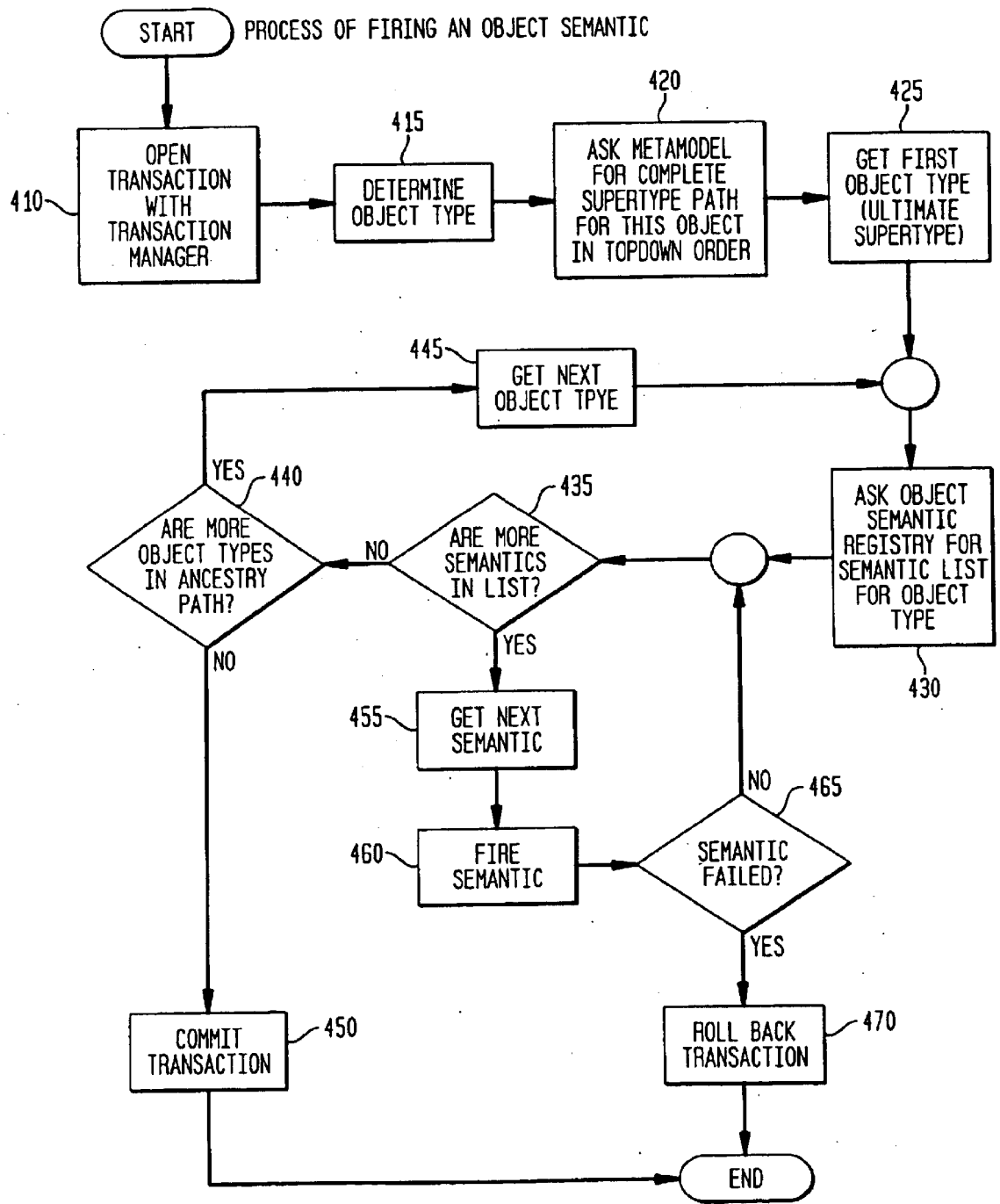
FIG. 4 illustrates a flow diagram of an exemplary embodiment of a method of firing an object semantic of the present invention.

FIG. 4, illustrates a flow diagram of an exemplary method of object/property interface 280 firing an object semantic. In 410, the object/property interface 280 opens transaction with transaction manager 285. A transaction is opened for each change to the model so that the change can be cancelled if found to be invalid. In 415, object/property interface 280 communicates with the object itself. All objects know their type to determine the object type. In 420, object/property interface 280 obtains the complete supertype path for a respective object from meta model 210, for example, in top-down order. In 425, the first object type (ultimate supertype) is obtained by object/property interface 280 from the metamodel.

In 430, object/property interface 280 obtains the semantic list for the object type from object semantic registry 220. In 435, object/property interface 280 communicates with semantic registry 220 to determine whether more semantics are in the list. If yes, object/property interface 280 obtains, in 455, and fires, in 460, the next semantic. The object/property interface 280 determines, in 465, if the semantic failed. If so, in 470, the transaction is rolled back by the transaction manager 285 pursuant to a request from object/property interface 280. If, however, the semantic did not fail, in 435, object/property interface 280 will again determine whether any more semantics are in the list.

If no more semantics are in the list, in 440, object/property interface 280 will communicate with the metamodel and determine whether any more object types are in the ancestry path. If no, in 450, the transaction is committed. If there are more object types in the ancestry path, in 445, the next object type is obtained and object/property interface 280 again proceeds in 430 with obtaining the semantic list for object type from object semantic registry.

Figure 5:
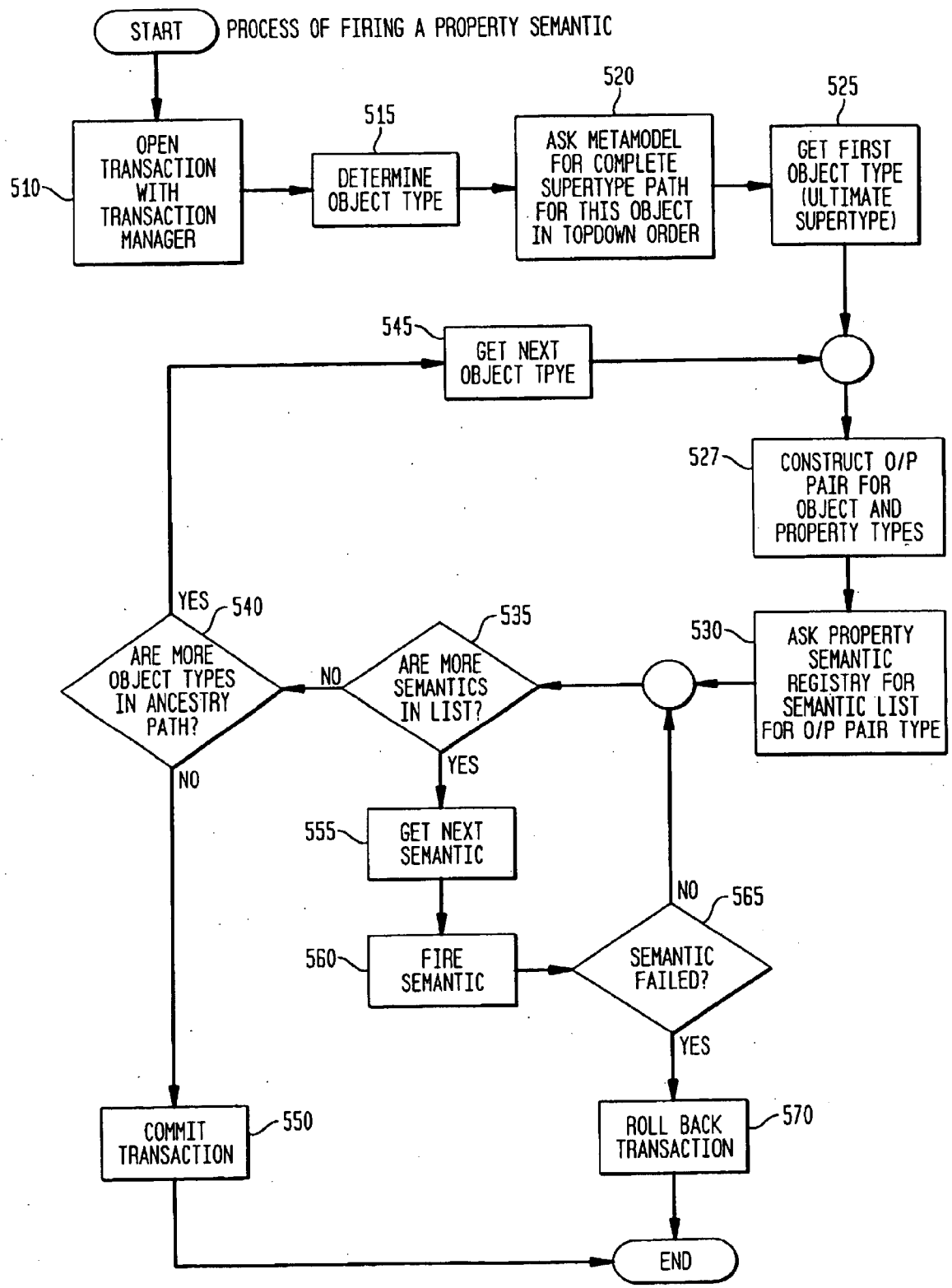
FIG. 5 illustrates a flow diagram of an exemplary embodiment of a method of firing a property semantic of the present invention.

FIG. 5 illustrates a flow diagram of an exemplary method of object/property interface 280 firing a property semantic.

In 510, object/property interface 280 opens the transaction with transaction manager 285. In 515, object/property interface 280 communicates with the object to determine the object type. In 520, object/property interface 280 obtains the complete supertype path for the respective object from meta model 210, for example, in top-down order. In 525, the first object type (ultimate supertype) is obtained by object/property interface 280 from the metamodel. In 527, object/property interface 280 constructs an object/property pair for object and property types. In 530, object/property interface 280 obtains the semantic list for the object/property pair type from property semantic registry 530.

In 535, object/property interface 280 determines whether more semantics are in the list. If yes, in 555, object/property interface 280 obtains the next semantic and in 560 fires the next semantic. In 565, if object/property interface 280 determines that the semantic failed, in 570, the transaction is rolled back. If, however, the semantic did not fail, object/property interface 280 will return to 535 to determine whether any more semantics are in the list.

If no more semantics are in the list, in 540, object/property interface 280 will communicate with the metamodel and determine whether any more object types are in the ancestry path. If no, the transaction is committed in 550. If there are more object types in the ancestry path, in 545, the next object type is obtained and object/property interface 280 again proceeds with constructing an object property pair for object and property types in 527.

In an exemplary embodiment of the present invention, object/property model 290 includes a set of predefined objects and properties. The predefined set of objects and properties may be provided by, for example, the UMA developer to decrease the amount of work necessary for the developer of the product. The object/property model 290 also receives objects and properties from an object/property interface 280. The objects and properties received from the object/property interface are based on the external definition of the meta data provided by the developer. It is the objects and properties requested, for example, by a developer to be created and modified that are included in object/property model 290. Further, the object/property model 290 logs model changes to the transaction manager 285 through an object/property interface 280. In an exemplary embodiment of the present invention, however, objects and properties in object/property model 290 that are a result of a failed action are removed from object/property model 290.

Accordingly, in an exemplary embodiment of the present invention, objects and properties provided by a developer that remain in the object/property model 290 are the objects and properties that result from a successful action. Thus, a developer does not have direct access to and cannot directly change the object/property model 290. Consequently, changes to the model are known by the modeling engine and consistent and valid states can be assured at all times. If the developer had direct access to the underlying data structures, inappropriate changes may be made thereby creating invalid states in the model.

The transaction manager 285 places respective objects and properties in the state that they were in prior to being changed by a failed action. For example, the transaction manager 285 is provided with the indication that an action has failed by the object/property interface 280. Any action that fails is undone or wiped out. The transaction manager 285 may accomplish this, for example, by logging changes of object/property model 290 to log file 295, obtaining undo data from the log file 295, and performing an undo operation based on the success or failure of actions within a transaction as determined by object/property interface 280. Accordingly, object/property model 285 is maintained in a valid state. In an exemplary embodiment of the present invention, transaction manager 285 may also receive a request to undo or redo an action from UMA-based application 225. If a redo is being requested, transaction manager 285 may request redo information from log file 295 and perform the redo operation an a known manner.

In an exemplary embodiment of the present invention, UMA 200 may further include an internal services component and an external services interface. The internal services component may include, for example, services or functions exposed to the developer to assist in the creation and manipulation of a model for solving the problem domain of the developer. In an exemplary embodiment of the present invention, internal services may include those services or functions indicated in Appendix 1 attached herein.

The external services interface is an interface which allows external services to communicate with UMA 200. The external services interface may be, for example, an object linking and embedding an add-in application program interface allowing third-party modules to extend the modeling capabilities of the tool, thus extending the modeling environment and the modeling rules to include functionality such as being automatically user-defined. Accordingly, the developer may have access to services beyond the services internal to UMA 200. External services may be, for example, a module for enforcing corporate naming standards upon all names entered by the user. Further, UMA 200 is scalable as the user interface such as UMA-based application 225 is separated from the semantics 230.

Figure 6:
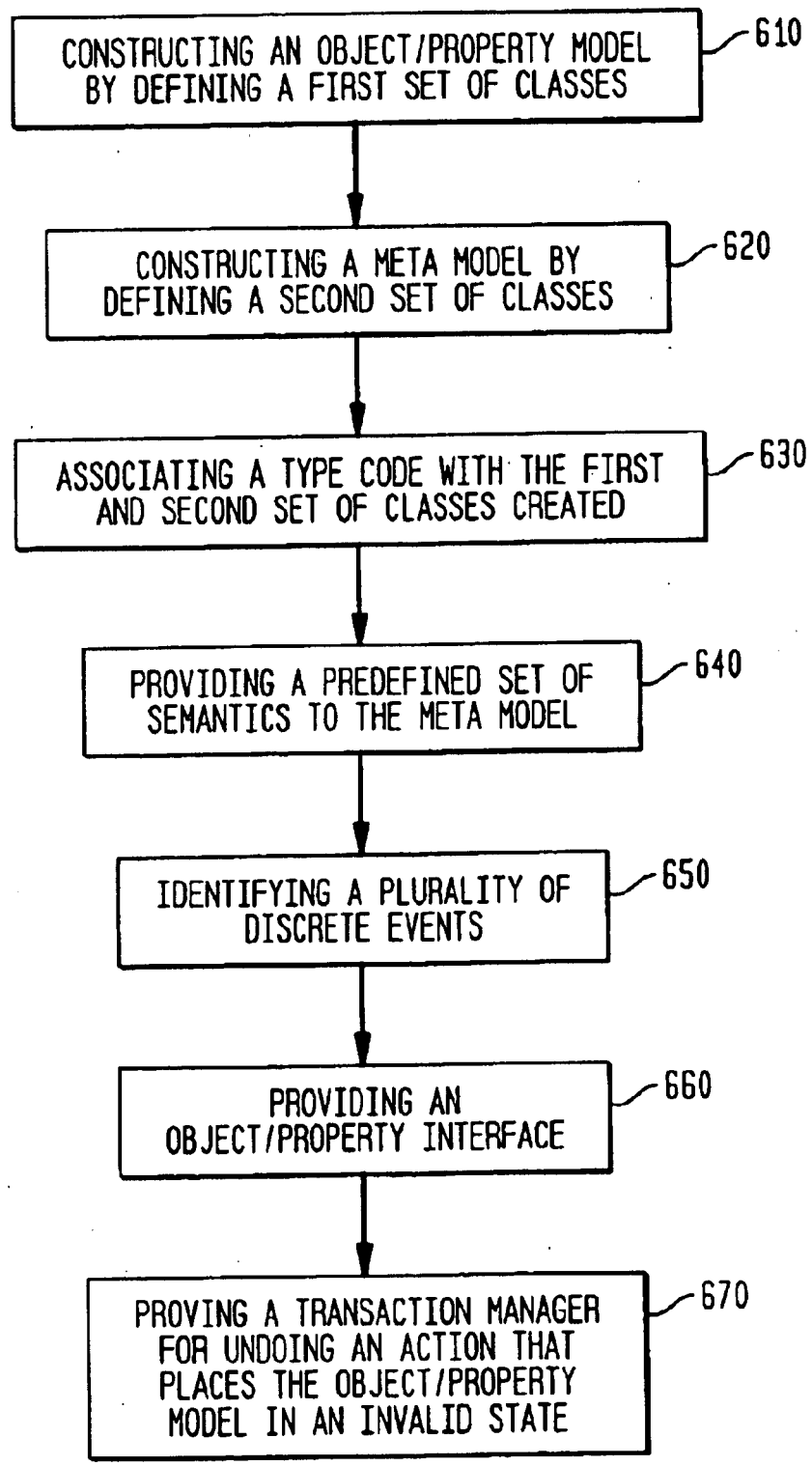
FIG. 6 illustrates a flow diagram of an exemplary embodiment of a method for building a modeling tool of the present invention.

An exemplary embodiment of a method for building modeling tools of the present invention is shown in FIG. 6. In 610, an object/property model 290 is constructed by defining a first set of classes for objects and properties provided by the developer as meta data. In an exemplary embodiment of the present invention, the object/property model 290 may include a predefined set of one or more objects and properties. The objects provide storage mechanisms for the properties that apply to it. In an exemplary embodiment of the present invention, an interface class for an object may be, for example, UMEObjectI. Properties may be implemented as a base class that requires programmer subclassing. In an exemplary embodiment of the present invention, the base class may provide administration services without data storage. In an exemplary embodiment of the present invention, a developer may provide a subclass that declares the data element and a method for creating an accessor.

In 620, a meta model 210 is constructed, for example, by defining a second set of classes. The second set of classes are designed to hold descriptions of properties, objects and semantics. For example, in an exemplary embodiment of the present invention, two semantic interface classes are specified. A first semantic interface class, for example, UMEobjectSemanticI, is the interface for any semantic that affects the creation or destruction of an object. Further, a second semantic interface class, for example, UMEPropertySemanticI, is the interface for any semantic that affects the creation, destruction, or modification of a property. In an exemplary embodiment of the present invention, the implementation of a representation of meta model 210 includes a singleton object that exposes static methods for registering meta data and semantics.

Modeling rules, e.g., semantics 230, may be incorporated into semantic registry 220 of meta model 210 as a predefined set of semantics as in 640 and/or as additional sets of semantics, for example, provided by a developer either upon startup or any time thereafter. In order to incorporate a modeling rule into meta model 210 for an object, the developer subclasses the appropriate calls, for example, UMEObjectSemanticI for a modeling rule for an object and UMEPropertySemanticI for a modeling rule for a property. The developer also could implement a fire method to perform the desired operations and checks upon object/property model 290. A value will be returned to indicate whether the operation was successful. For example, a return value of TRUE would indicate that the operation was successful, and a return value of FALSE would indicate that the operation could not be performed successfully or that the model was in an invalid state. Access points (e.g., object/property model modification points) may also be included in meta model 210 for invoking semantics 230. The various model modification points (e.g., CreateObject) would invoke the respective semantic at the appropriate point. If an indication is received from the firing of semantics that one or more semantics had failed to complete successfully, for example, FALSE, the operation could then abort.

In 630, a type code is associated with the first and second set of classes. A type code is a unique identifier that specifies what type of meta data is being represented. Each item specified in the meta model, both objects and properties, would have a unique type code. In an exemplary embodiment of the present invention, UMA 200 includes a variable type, TypeCode_t, which is declared to hold the type codes. A predefined set of semantics is provided to the semantic registry 220 of meta model 210 in 640.

In 650, a plurality of discrete events, for example, as shown in Table One, are identified. The discrete events indicate occurrences where object/property model 290 may be modified. In an exemplary embodiment of the present invention, each discrete event is assigned a constant to represent it, and a variable type, for example, Event_t, is declared to hold the event constants.

In 660, object/property interface. 280 is provided. The object/property interface 280, for example, prevents a developer from directly accessing object/property model 290 and may include limiting the number of code paths by which a developer could modify object/property model 290. For example, if a developer wanted to destroy an object in object/property model 290, a request would have to be made to object/property interface 280 such as UMEObjectI:DestroyObject as listed in Appendix 1.

Figure 7:
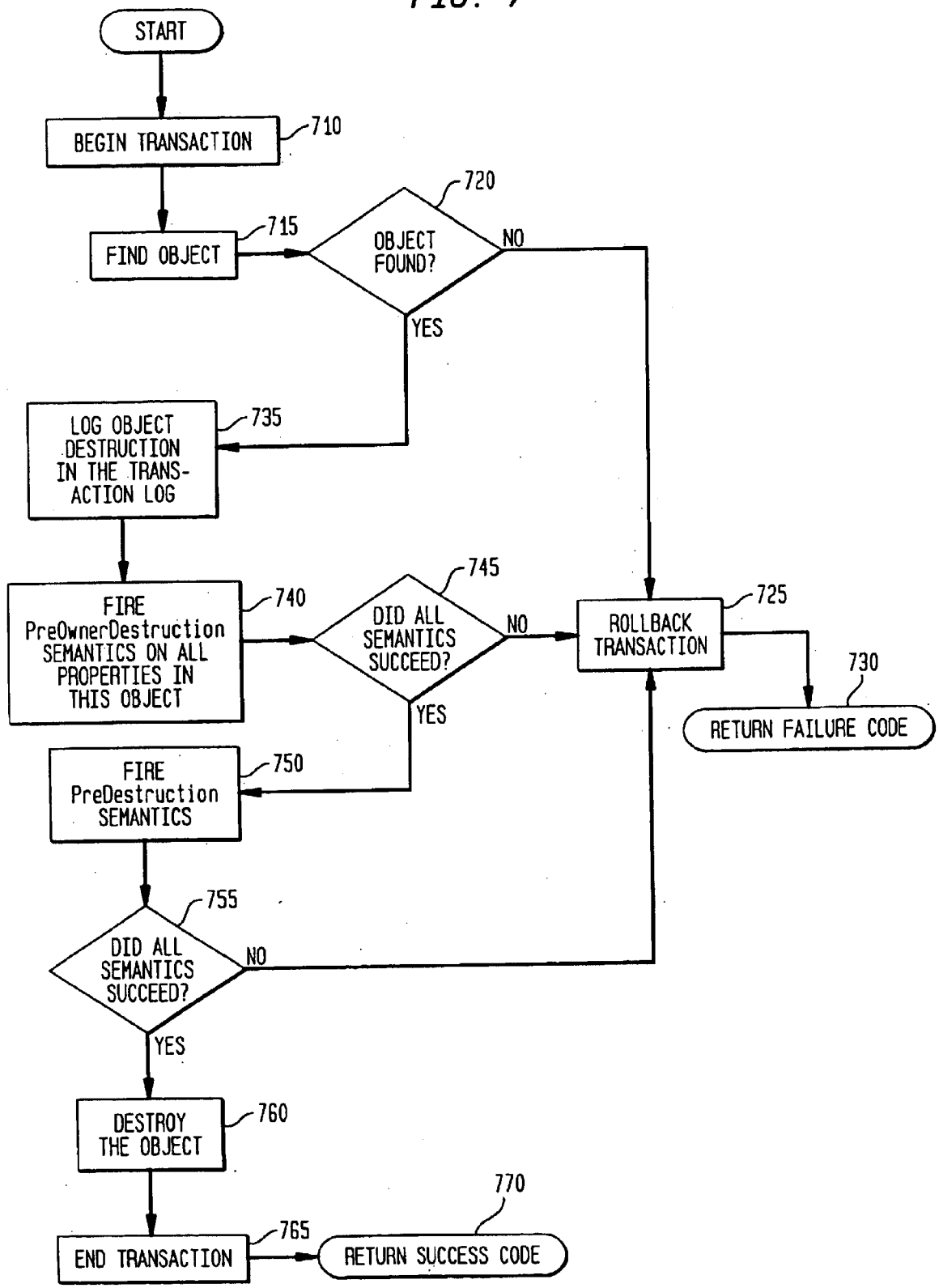
FIG. 7 illustrates a flow diagram of an exemplary embodiment of executing an exemplary function of the present invention.

FIG. 7 shows an exemplary embodiment of object/property interface 280 executing DestroyObject request. As shown in FIG. 7, access to object/property model 290 is limited by object/property interface 280 handling the DestroyObject request. For example, in 710, object/property interface 280 communicates with transaction manager 285 to open a transaction upon receiving a request to destroy an object (e.g., DestroyObject function). In 715, object/property interface 280 communicates with object/property model 290 to find the object requested to be destroyed. In 720, object/property interface 280 determines whether the object was found. If not, in 725, transaction manager 285 rolls back the transaction pursuant to a request by object/property interface 280 and in 730 transaction manager returns a failure code to the calling module, for example, the user interface. If the object is found, however, in 735, object/property interface 280 provides transaction manager 285 with the object destruction information and transaction manager 285 logs the object destruction into transaction log 295.

In 740, object/property interface 280 fires the PreOwnerDestruction Semantics on all properties of the respective object. In 745, object/property interface 280 determines whether all semantics succeeded. If not, in 725, transaction manager 285 rolls back the transaction pursuant to a request by object/property interface 280 and 730 transaction manager returns a failure code to the calling module.

If all the Preowner Destruction Semantics succeeded, in 750, object/property interface 280 fires the PreDestruction Semantics. In 755, object/property interface 280 determines whether all of the PreDestruction Semantics succeeded. If so, in 760, the object is destroyed, in 765, object/property interface 280 communicates to transaction manager 285 to end transaction, and in 770, 730, transaction manager 285 returns a success code to the calling module. If the PreDestruction Semantics failed, however, in 725, transaction manager 285 rolls back transaction pursuant to a request from object/property interface 280 and 730, and transaction manager 285 returns a failure code to the calling module.

To limit construction and destruction of objects, for example, object constructors and destructors are protected to prevent the developer from directly instantiating or destroying an object. To limit the creation, destruction and modification of properties, for example, the data members of the properties are made private. In an exemplary embodiment of the present invention, UMA 200 includes a class known as an accessor that includes an interface class, for example, UMEAccessorI. The accessor interface class is a friend class to the property and it is through accessors that access is gained to the data members. Accessors are provided with data values and instructions (e.g., "set the value" or "delete the property") and injected into properties. Accessors perform their actions and return a code indicating success or failure. Accessors are constructed by asking the property to provide one. This allows the property to construct an accessor that can handle the data type of the property. All operations on a property are conducted via an accessor, thus any code that the semantics require could be placed in the accessor base class that is supplied. The developer subclassing accessor would simply provide a data element and a way of reading and writing to it. Methods are provided on the accessor base class to allow the binding to a property.

As shown in FIG. 6, in 670, a transaction manager 285 is provided. The transaction manager 285 manages actions of a transaction and if the actions fail, the actions are undone or are wiped out. By starting a transaction at the beginning of a model manipulation, then monitoring the error states of the various semantics, the transaction manager 285 maintains the object/property model 290 in a valid state. In an exemplary embodiment of the present invention, transaction manager 285 records an exact image of object/property model 290 prior to the implementation of a change based on an action. If the action succeeds, the respective change is allowed to stand. If a failure occurs, then transaction manager 285 restores the old image. The transaction manager 285 may incrementally preserve images as the model changes.

As an example, within a single transaction the user is going to create an object and set its name. Upon successful creation of an object, the fact that the object was created and a handle to that object are stored in the transaction log 295. If the user then sets the name of the object to "Customer," the creation of the property is recorded and the old value (nothing) is saved to the log. If the user then sets the name again to "Cust," the old value ("Customer") is saved to the log. If all succeeds, then an object named "Cust" exists. On failure, however, transaction manager 285 will start rolling back: first, changing the name from "Cust" to "Customer"; second, deleting the existence of the name property altogether; and finally, deleting the object. This restores object/property model 290 to the state that existed prior to the performance of the failed transaction.

In an exemplary embodiment of the present invention, the changed objects and properties as a result of an action are provided to object/property model 290 by object/property interface 280. If the semantics involved by the action fail, object/property interface 280 informs transaction manager 285 to undo the action. As a result, object/property model 290 is placed back in the state prior to the changed objects and properties being provided to the object property model 290 from the object/property interface 280 as a result of the failed action.

The embodiments described above are illustrative examples of the present invention and it should not be construed that the present invention is limited to these particular embodiments. Various changes and modifications may be effected by one skilled in the art without departing from the spirit or scope of the invention as defined in the appended claims.

What is claimed is:

1. An apparatus for building a modeling tool, comprising:
   a meta model including a semantic registry and a meta data manager, the meta data manager having information about one or more objects or properties or combination thereof, and the semantic registry having one or more rules to be enforced when modeling the one or more objects or properties:
   an object/property interface;
   an object/property factory registry coupled to the meta model and the object/property interface, the object/property factory registry operable to create one or more instances of the one or more objects or properties based on the description in the meta data manager and the one or more rules in the semantic registry, and
   an object/property model coupled to the object/property interface, the object/property model having the one or more instances of the one or more objects or properties received via the object/property interface from the object/property factory registry.

2. The apparatus according to claim 1, further comprising a transaction manager coupled to the object/property interface for undoing an action that places the object/property model in an invalid state.

3. The apparatus according to claim 2, further comprising a log file coupled to the transaction manager object/property interface.

4. The apparatus according to claim 1, wherein the semantic registry of the meta model includes at least a predefined set of semantics.

5. The apparatus according to claim 1, wherein the semantic registry of the meta model includes at least one set of semantics provided by a developer.

6. The apparatus according to claim 1, wherein the object/property factory registry of the meta model includes at least one object factory for creating an instance of an object and one property factory for creating an instance of a property.

7. The apparatus according to claim 1, wherein the object/property model includes a predefined set of at least one of a plurality of objects and a plurality of properties.

8. The apparatus according to claim 1, wherein the object/property model includes instances of objects and properties based on an external definition of the meta model.

9. The apparatus according to claim 1, wherein the object/property interface limits access to the object/property model.

10. A method for building a modeling tool comprising:
    constructing an object/property model by defining a first set of classes, the object/property model operable to store instances of one or more objects or properties;
    constructing a meta model by defining a second set of classes, the meta model operable to store information about the one or more objects or properties and fir operable to store;
    associating a type code with the first and second set of classes to couple the one or more instances of the one or more objects or properties in the object/property model with the one or more objects or properties defined in the meta model;
    providing a predefined set of semantics to the meta model, the predefined set of semantics including one or more rules for modeling the one or more objects or properties defined in the meta model;
    identifying a plurality of discrete events, wherein at least one semantic of the set of semantics is invoked at each occurrence of the plurality of discrete events; and
    providing an object/property interface for limiting access to the object/property model.

11. The method according to claim 10, further comprising:
    providing a transaction manager for undoing an action that places the object/property model in an invalid state.

12. The method according to claim 10, wherein the object/property model includes a predefined set of at least one of a plurality of objects and a plurality of properties.

13. The method according of claim 10, wherein the object/property model includes instances of objects and properties based on an external definition of the meta model provided by the developer.

14. The method according to claim 10, wherein the meta model includes at least one set of semantics provided by the developer.

15. An apparatus for building a modeling tool, comprising:
    a first model including a registry and a data manager, the data manager including information about one or more objects or properties;
    an interface;
    a factory registry coupled to the first model and the interface, the factory registry operable to create one or more instances of the one or more objects or properties on the information; and
    a second model coupled to the interface, the second model operable to store the one or more instances,
    wherein the registry includes semantics that define one or more rules for modeling the one or more objects.

16. A method for building a modeling tool, comprising:
    constructing a first model by defining a first set of classes, the first model including information about one or more objects or properties;
    constructing a second model by defining a second set of classes, the second model including one or more instances created based on the information about the one or more objects or properties;

associating a type code with the first and second set of classes;

providing a predefined set of semantics to the first model, the predefined set of semantics including one or more rules for creating and manipulating the instances;

identifying a plurality of discrete events, wherein at least one semantic of the set of semantics is invoked at each occurrence of the plurality of discrete events; and providing an interface for limiting access to the first model.

17. The apparatus of claim 1, wherein the object/property interface is further operable to provide access to the one or more instances of the one or more object or properties in the object/property model.

* * * * *